(12) United States Patent
Chang

(10) Patent No.: US 7,370,441 B2
(45) Date of Patent: May 13, 2008

(54) HOBNAIL STRUCTURE

(76) Inventor: Chuan-Li Chang, No. 13, Lane 188, Jong Shing N. St., San Chung City, Taipei Hsien (TW)

( * ) Notice: Subject to any disclaimer, the term of this patent is extended or adjusted under 35 U.S.C. 154(b) by 309 days.

(21) Appl. No.: 11/325,538

(22) Filed: Jan. 5, 2006

(65) Prior Publication Data

US 2007/0172331 A1 Jul. 26, 2007

(51) Int. Cl.
*A43C 15/00* (2006.01)

(52) U.S. Cl. ........................ 36/67 D; 36/134

(58) Field of Classification Search ............... 36/67 R, 36/67 D, 134
See application file for complete search history.

(56) References Cited

U.S. PATENT DOCUMENTS

| 2,026,280 A | * | 12/1935 | Kerin | 36/59 R |
|---|---|---|---|---|
| 2,292,239 A | * | 8/1942 | Pierce et al. | 36/59 R |
| 2,294,462 A | * | 9/1942 | King et al. | 36/59 R |
| 2,299,927 A | * | 10/1942 | Pierce et al. | 36/59 R |
| 2,306,308 A | * | 12/1942 | Goldenberg | 36/59 R |
| 2,330,458 A | * | 9/1943 | Tubbs | 36/59 R |
| 2,412,788 A | * | 12/1946 | Vietas et al. | 36/134 |
| 2,471,113 A | * | 5/1949 | Melehionna | 36/134 |
| 3,133,364 A | * | 5/1964 | Wormelle, Jr. et al. | 36/59 R |
| 3,656,245 A | * | 4/1972 | Wilson | 36/67 D |
| 4,472,097 A | * | 9/1984 | Kiefer et al. | 411/369 |
| 4,472,098 A | * | 9/1984 | Kiefer | 411/369 |
| 4,712,318 A | * | 12/1987 | Greiner et al. | 36/134 |
| 5,386,651 A | * | 2/1995 | Okamoto | 36/134 |
| 5,743,029 A | * | 4/1998 | Walker et al. | 36/134 |
| 6,502,332 B1 | * | 1/2003 | Nakayama | 36/134 |

FOREIGN PATENT DOCUMENTS

EP 501853 A1 * 9/1992

* cited by examiner

*Primary Examiner*—Marie Patterson
(74) *Attorney, Agent, or Firm*—Troxell Law Office, PLLC

(57) ABSTRACT

A hobnail structure is composed of a connection rod and a cap installed on the connection rod, wherein the connection rod is a bolt, one end of which is provided with a ring of larger diameter with slant grooves having a same direction of deflection as that of threads of the aforementioned bolt located at rims of the ring. The cap is a cover, the bottom surface of which is provided with a slot hole, the diameter of which is smaller than that of the ring of the connection rod, and the slot hole is latched to the ring of the connection rod, so as to form a hobnail structure. Accordingly, the connection rod will not escape from the cap, resulting from an excessive exertion of a rotation force upon tightening, when the hobnail is screwed to a hole seat on a sole.

5 Claims, 7 Drawing Sheets

HOBNAIL STRUCTURE

BACKGROUND OF THE INVENTION (a) Field of the Invention

The present invention relates to a hobnail structure, and more particularly to a hobnail structure that can be screwed to a hole seat at sole of a sports shoe, so as to enhance a tight assembling of the hobnail and sole.

(b) Description of the Prior Art

As a promotion of sport quality, all kinds of sports shoes are designed according to requirements of characteristics of each kind of sport. For example, soccer is a kind of worldwide sport wherein fast movements and instant stand-stills are required for a player during offense or defense. Therefore, a plurality of hobnails is installed on the soles of sports shoes to enhance their grip. However, to facilitate a replacement and maintenance of hobnails, the hobnail structures are provided with threads that can be screwed to the hole seats.

Referring to FIG. 1, for a conventional hobnail structure, a plurality of hole seats 60 is specifically located at predetermined positions on a sole, and each hole seat is screwed with a hobnail 61 which is provided with a bolt 62 having external threads. A ring 63 of a larger diameter is located at one end of the bolt, and a plurality of grooves 64 is located radially at rims of the ring. The exterior of the grooves is compulsively latched with a cap 65, the lower end of which is latched with a decorative ring 66 at the same time. By way of screwing the bolt 62 to the hole seat, the hobnail can be conveniently replaced and maintained. However, upon screwing the conventional hobnail to the sole, it is often that the bolt 62 will be continuously shifted downward due to a function of the threads, such that the cap 65 is pushed against an end surface of the hole seat to form an reaction force when the decorative ring 66 is locked into an extremity, resulting from an excessive exertion of a rotation force with an auxiliary wrench. As the grooves 64 are located radially, it is very easy for the cap 65 to displace outward along a shifting of the radial grooves of the ring, and a gap will be created (as shown in FIG. 2) due to that the bolt 62 is moving in a direction opposite to that of the cap 65. In addition, it is easy to create a strip phenomenon, such that the cap will detach from the ring and be damaged, which is imperfect.

In view of the disadvantages existent in the prior art, the inventor has researched to improve the hobnail structure and experienced a number of tests. Accordingly, a hobnail structure that can be tightly locked and firmly fixed has been invented.

SUMMARY OF THE INVENTION

The primary object of the present invention is to provide a hobnail structure to be screwed to a hole seat of a sole, such that a connection rod will not escape from a cap resulting from an excessive exertion of a rotation force upon tightening.

To obtain the above objects, the present invention includes a connection rod and a cap installed on the connection rod, wherein the connection rod is a bolt, one end of which is provided with a ring of a larger diameter. Slant grooves having the same direction of deflection as that of threads of the aforementioned bolt is located at rims of the ring. The cap is a cover the bottom surface of which is provided with a slot hole of a diameter smaller than that of the ring of the connection rod, and the slot hole is latched to the ring of the connection rod, so as to form a hobnail, such that the connection rod will not escape from the cap resulting from an excessive exertion of a rotation force upon tightening, when the hobnail is screwed to a hole seat of the sole.

To completely appreciate these and other objects of the present invention as well as the invention itself, all of which will become apparent to those skilled in the art, the following detailed description of the invention and the claims should be read in conjunction with the accompanying drawings.

DETAILED DESCRIPTION OF THE PREFERRED EMBODIMENTS

Figure 2:
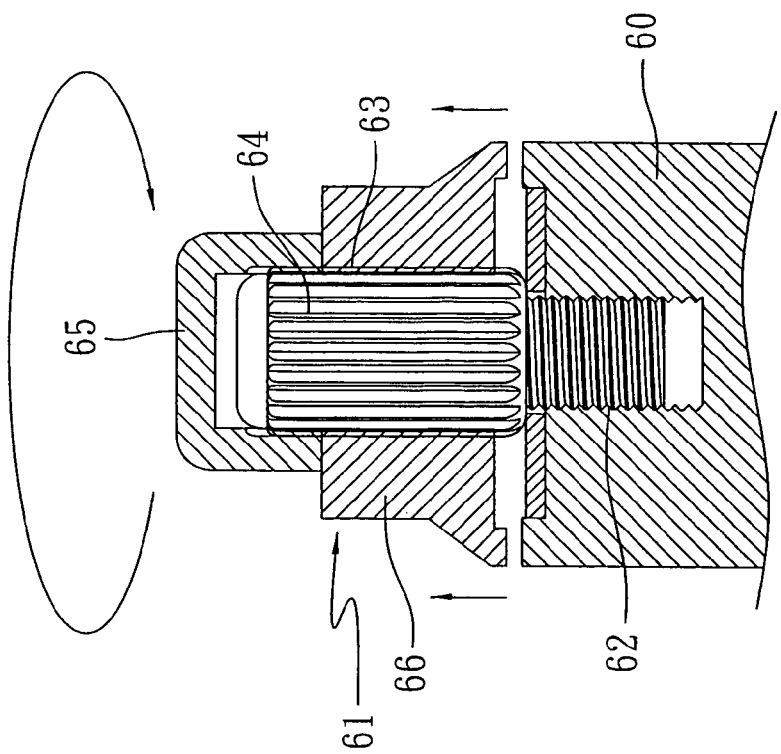
FIG. 2 is a cross-sectional view of a conventional hobnail which is excessively tightened.
Figure 1:
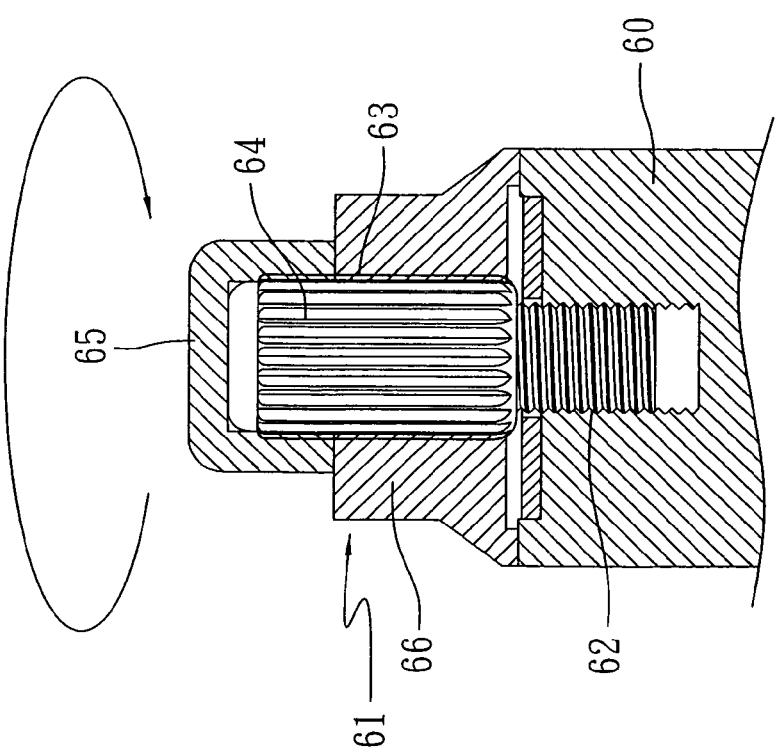
FIG. 1 is a cross-sectional view of a conventional hobnail.

Referring to FIG. 1 and FIG. 2, they show a structure of a conventional hobnail, the shortcomings of which have been described above.

Figure 3:
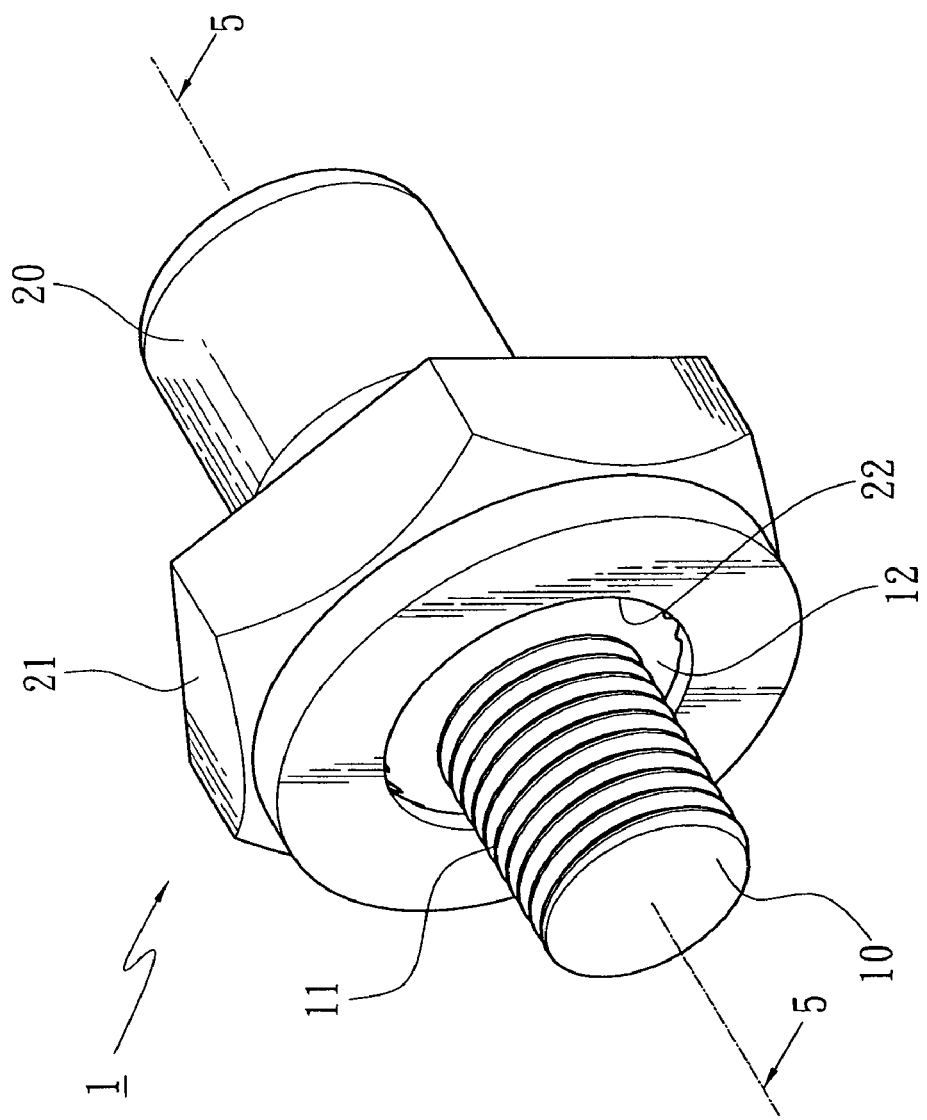
FIG. 3 is a perspective view of the present invention.
Figure 4:
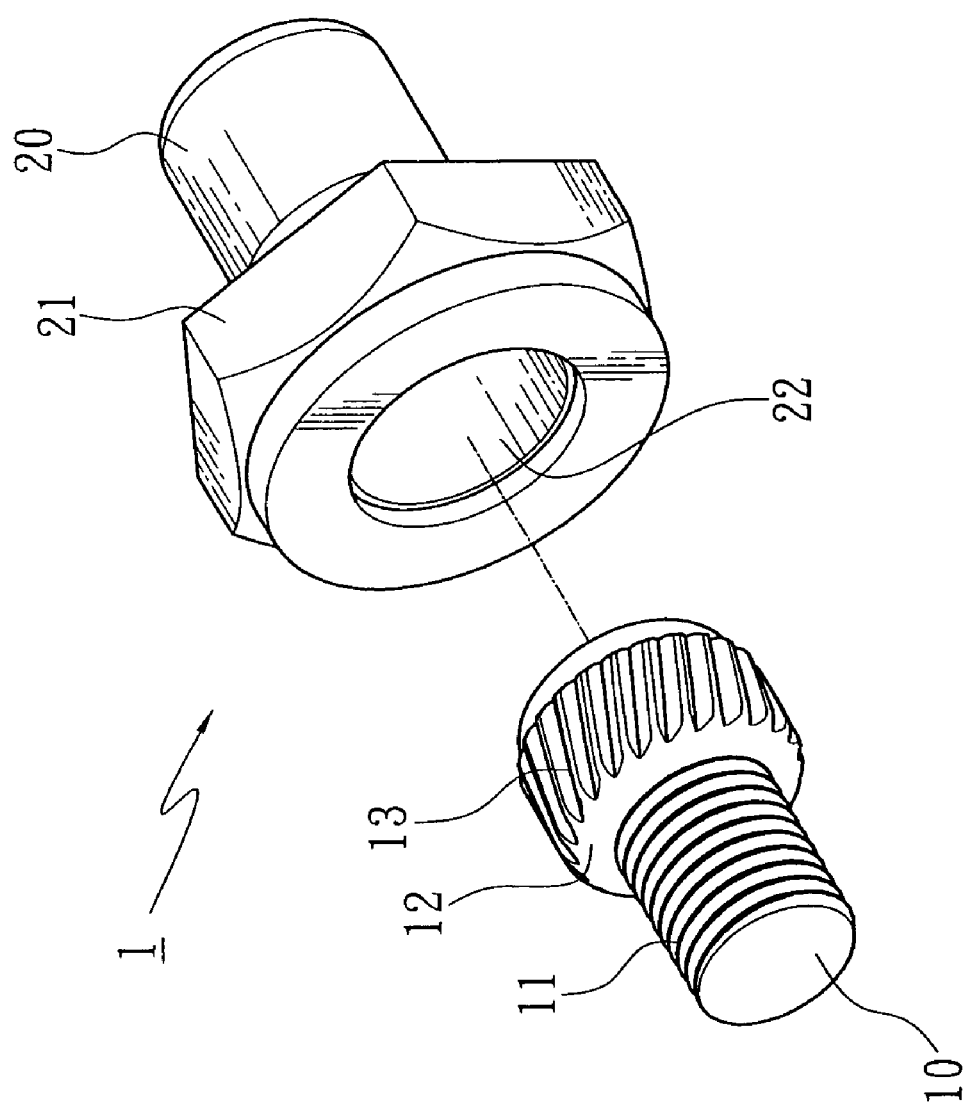
FIG. 4 is an exploded view of the present invention.
Figure 5:
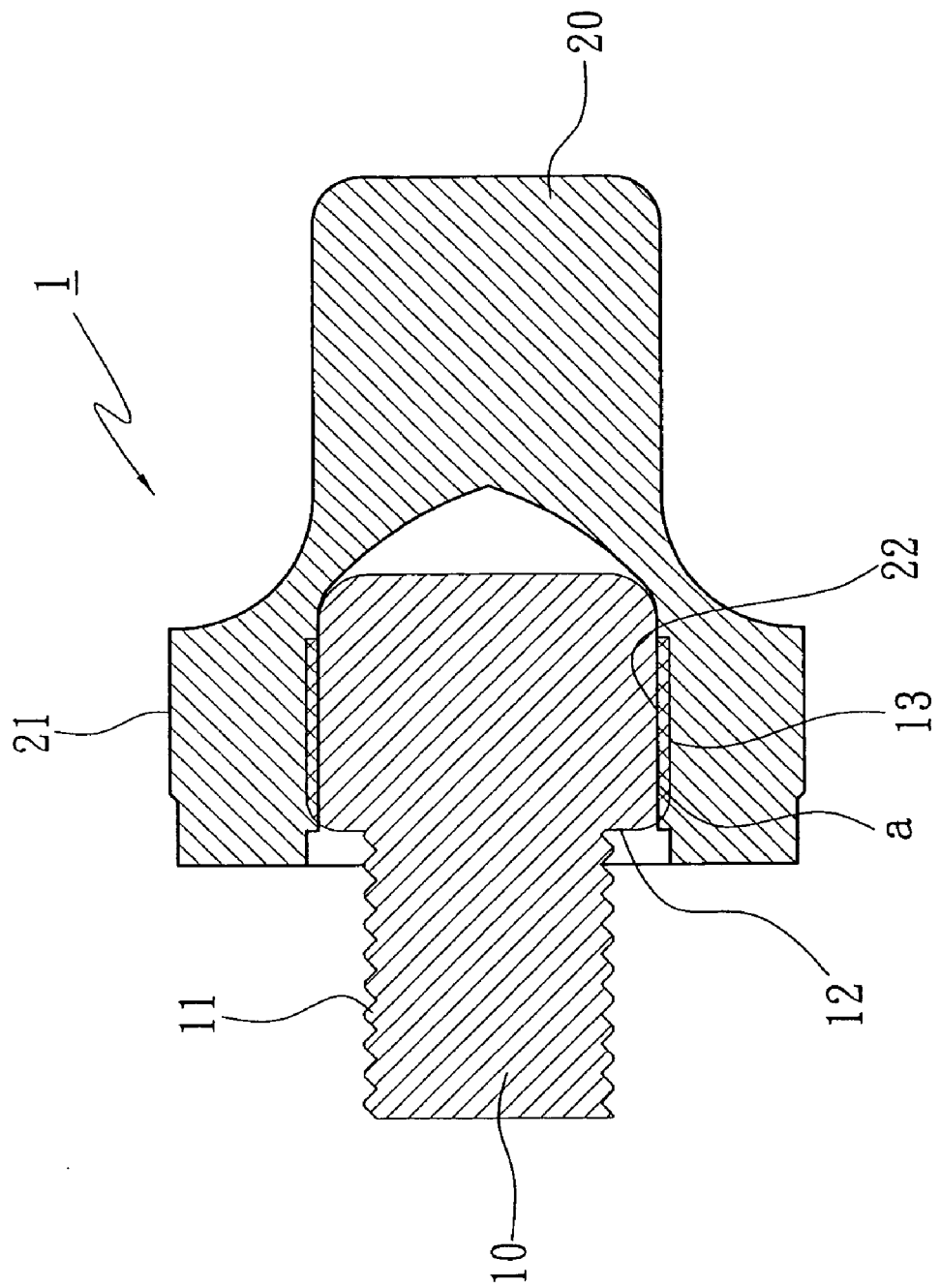
FIG. 5 is a cutaway view of the present invention.

Referring to FIGS. 3-5, a hobnail 1 comprises at least one connection rod 10 and a cap 20 installed on the connection rod.

Figure 7:
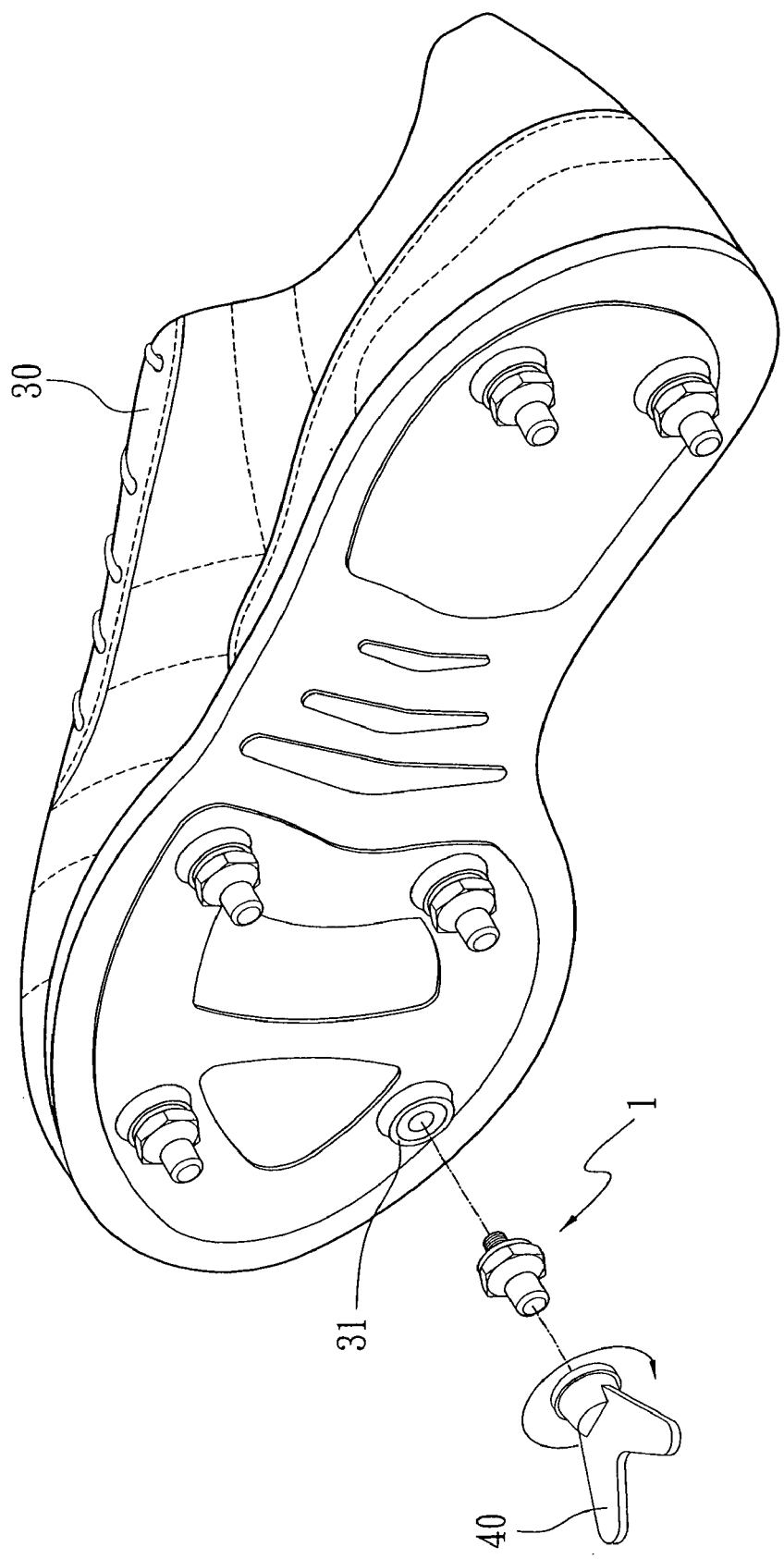
FIG. 7 is a perspective view of the present invention assembled with a sole.

The connection rod 10 is a bolt which is provided with threads 10 and installed with a ring 12 of a larger diameter at the other end. Slant grooves 13 having the same direction of deflection as that of the threads 11 of the aforementioned bolt are located at rims of the ring 12, and the cap 20 is latched on the top of the slant grooves 13. The cap 20 is a cover, the bottom rims of which are provided with a hexagonal cap body 21 for providing a sleeve wrench 40 (as shown in FIG. 7) to operate by rotating. A bottom end of the hexagonal cap body 21 is provided with a slot hole 22 of a diameter smaller than that of the ring 12 of the connection rod 10, and the slot hole 22 is latched on the ring 12 of the connection rod 10, to generate a fitting position a, such that the connection rod 10 and the cap 20 can be firmly assembled into the hobnail structure 1.

Figure 6:
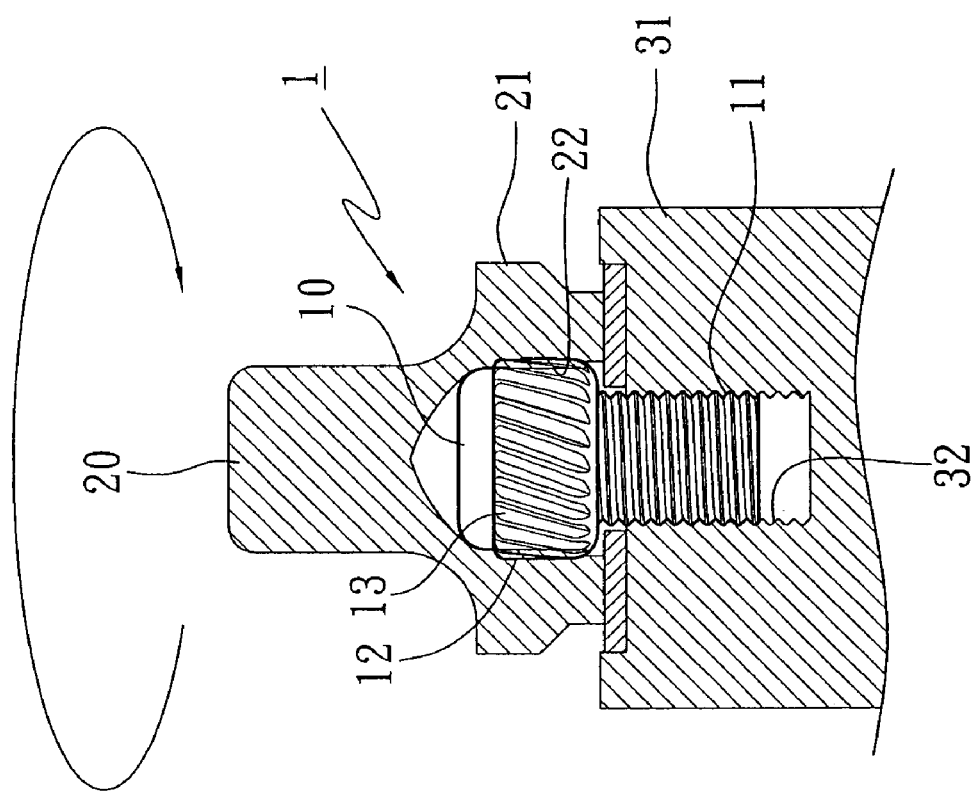
FIG. 6 is a cutaway view of the present invention assembled with a sole.

Referring to FIG. 5 and FIG. 6, upon screwing the hobnail 1 to a hole seat 31 at a sole of shoe 30 (as shown in FIG. 7), the sleeve wrench 40 is first emplaced on the hexagonal cap body 21 of the cap 20, and then the hexagonal cap body 21 is rotated into the hole seat 31 at the sole of shoe 30, so as to screw the threads 11 of the connection rod 10 with threads 32 in the hole seat 31. If an excessive force of rotation is exerted to the hobnail 1 upon tightening, as the ring 12 of the connection rod 10 is provided with the slant grooves 13 having the same direction of deflection as that of the threads 11 to enable the fitting position a of the cap 20 and the ring 12 to generate a helical phenomenon due to the slant grooves 13, thereby allowing the cap 20 to proceed downward. Therefore, a reaction force will not be formed due to that the cap 20 is pushed against an end surface of the hole seat 31, which results in that the connection rod 10 escapes from the cap 20. Accordingly, the connection rod will not escape from the cap, resulting from an excessive exertion of the rotation force upon tightening, when the hobnail 1 is screwed into the hole seat 31 of the shoe 30.

Figure 8:
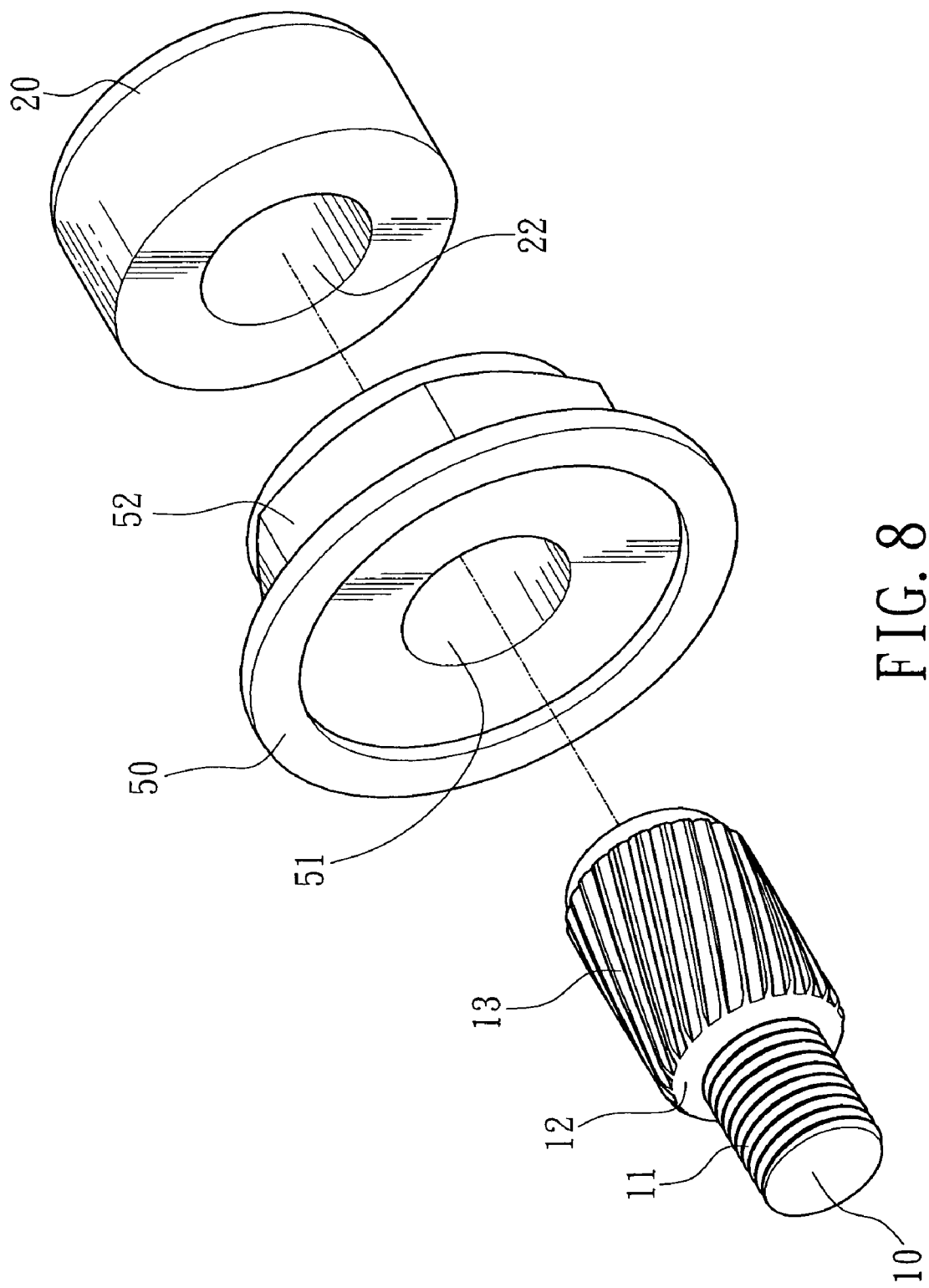
FIG. 8 is an exploded view of another embodiment of the present invention.

Referring to FIG. 8, it shows another embodiment of the present invention, which includes another decorative ring 50. A through-hole 51 having a same diameter as that of the slot hole 22 of cap 20 is located at an end surface of the decorative ring 50, and a hexagonal cap body 52 is located at rims of the decorative ring 50. When assembling, the ring 12 of the connection rod 10 is first latched to the cap 20, and then a part of the ring 12 which is protruded from the connection rod 10 is passed through the through-hole 51 of decorative ring 50, such that the cap 20 can be assembled with the end surface of decorative ring 50.

Accordingly, by the hobnail structure of present invention, the connection rod and the cap can be fixed easily and quickly, and the connection rod will not escape from the cap resulting from an excessive exertion of the rotation force upon tightening, when the hobnail is screwed to the hole seat of sole.

While certain novel features of this invention have been shown and described and are pointed out in the annexed Claims, it is not intended to be limited to the details above, since it will be understood that various omissions, modifications, substitutions and changes in the forms and details of the device illustrated and in its operation can be made by those skilled in the art without departing in any way from the spirit of the present invention.

What is claimed is:

1. A hobnail structure comprising a connection rod which is a bolt, one end of which is provided with a ring of a larger diameter, with slant grooves having the same direction of deflection as that of threads of the aforementioned bolt located at rims of the ring; a cap which is a cover, the bottom surface of which is provided with a slot hole, the diameter of which is smaller than the outer diameter of the ring of the connection rod; the ring of the connection rod being able to be latched to the slot hole of the cap.

2. The hobnail structure according to claim 1, wherein the bottom rims of the cap are provided with a hexagonal cap body.

3. The hobnail structure according to claim 1, wherein the bottom of the cap includes a decorative ring on which a through-hole is provided.

4. The hobnail structure according to claim 3, wherein the diameter of the through-hole of the decorative ring is the same as that of the slot hole of the cap.

5. The hobnail structure according to claim 3, wherein the rims of the decorative ring are provided with a hexagonal cap body.

* * * * *